United States Patent [19]

Morinaga

[11] Patent Number: 4,499,573
[45] Date of Patent: Feb. 12, 1985

[54] DISC ROTATING APPARATUS

[75] Inventor: Kaoru Morinaga, Yokohama, Japan

[73] Assignee: Tokyo Shibaura Denki Kabushiki Kaisha, Kawasaki, Japan

[21] Appl. No.: 399,234

[22] Filed: Jul. 19, 1982

[30] Foreign Application Priority Data

Jul. 20, 1981 [JP] Japan ................................ 56-113248
Jul. 20, 1981 [JP] Japan ................................ 56-113249
Jul. 20, 1981 [JP] Japan ................................ 56-113250

[51] Int. Cl.³ .......................... G11B 3/60; G11B 25/04; G11B 23/00
[52] U.S. Cl. .................................. 369/270; 369/75.2; 369/266; 360/133
[58] Field of Search ................. 369/77.2, 75.1, 75.2, 369/270, 266; 360/133

[56] References Cited

U.S. PATENT DOCUMENTS

| | | | |
|---|---|---|---|
| 3,156,472 | 11/1964 | Brock | 369/269 |
| 3,193,295 | 7/1965 | Isemura | 369/75.1 |
| 3,768,815 | 10/1973 | Mathurin | 346/137 |
| 3,891,796 | 6/1975 | Takahara et al. | 360/86 |
| 4,068,851 | 1/1978 | Yamamura | 369/266 |
| 4,194,743 | 3/1980 | Ohsawa et al. | 369/266 |
| 4,232,870 | 11/1980 | Iemenschot | 369/270 |
| 4,306,259 | 12/1981 | Saito et al. | 360/133 |

FOREIGN PATENT DOCUMENTS

| | | |
|---|---|---|
| 2909099 | 11/1980 | Fed. Rep. of Germany . |
| 2252625 | 11/1974 | France . |
| 2304136 | 3/1976 | France . |
| 10424 | 6/1969 | Japan .................................. 369/78 |
| 149011 | 12/1978 | Japan ................................ 369/270 |
| 55-93871 | 6/1980 | Japan . |
| 55-165473 | 11/1980 | Japan . |
| 55-153662 | 11/1980 | Japan . |

Primary Examiner—Steven L. Stephan
Attorney, Agent, or Firm—Finnegan, Henderson, Farabow, Garrett & Dunner

[57] ABSTRACT

A disc rotating apparatus for use in a dic player. The disc rotating apparatus is provided with a turntable adapted for receiving a disc and a clamping mechanism for clamping the disc against the turntable in cooperation with the turntable. The disc clamping mechanism includes a plunger slidable along an axis of the plunger and rotatable about the same axis, a holder for holding the plunger and a magnetic propelling mechanism for propelling the plunger toward the disc received on the turntable. The magnetic propelling mechanism urges the plunger against the disc by means of magnetic force caused by a permanent magnet.

14 Claims, 11 Drawing Figures

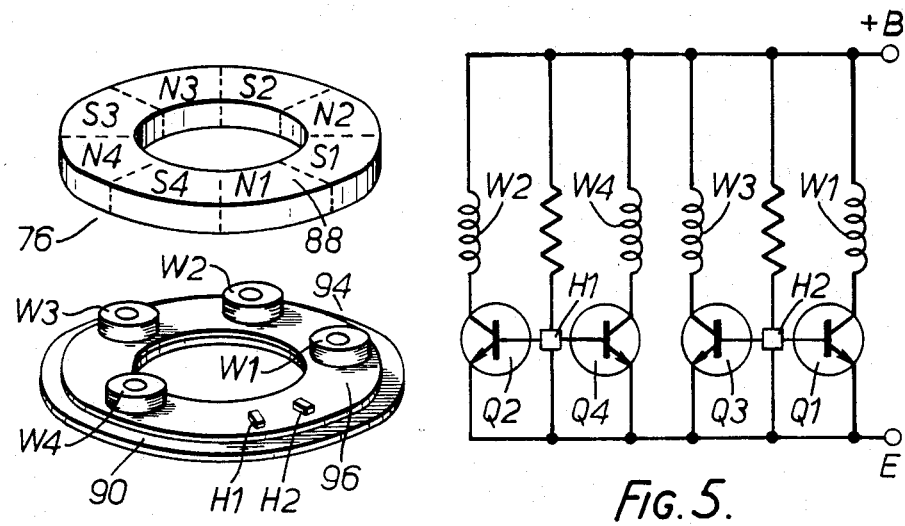
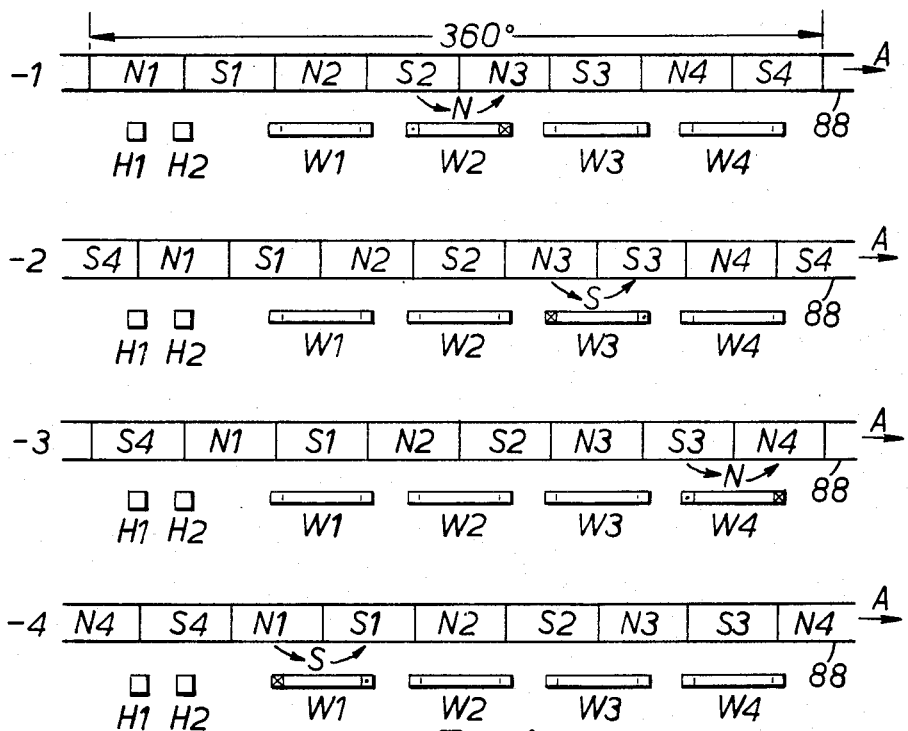

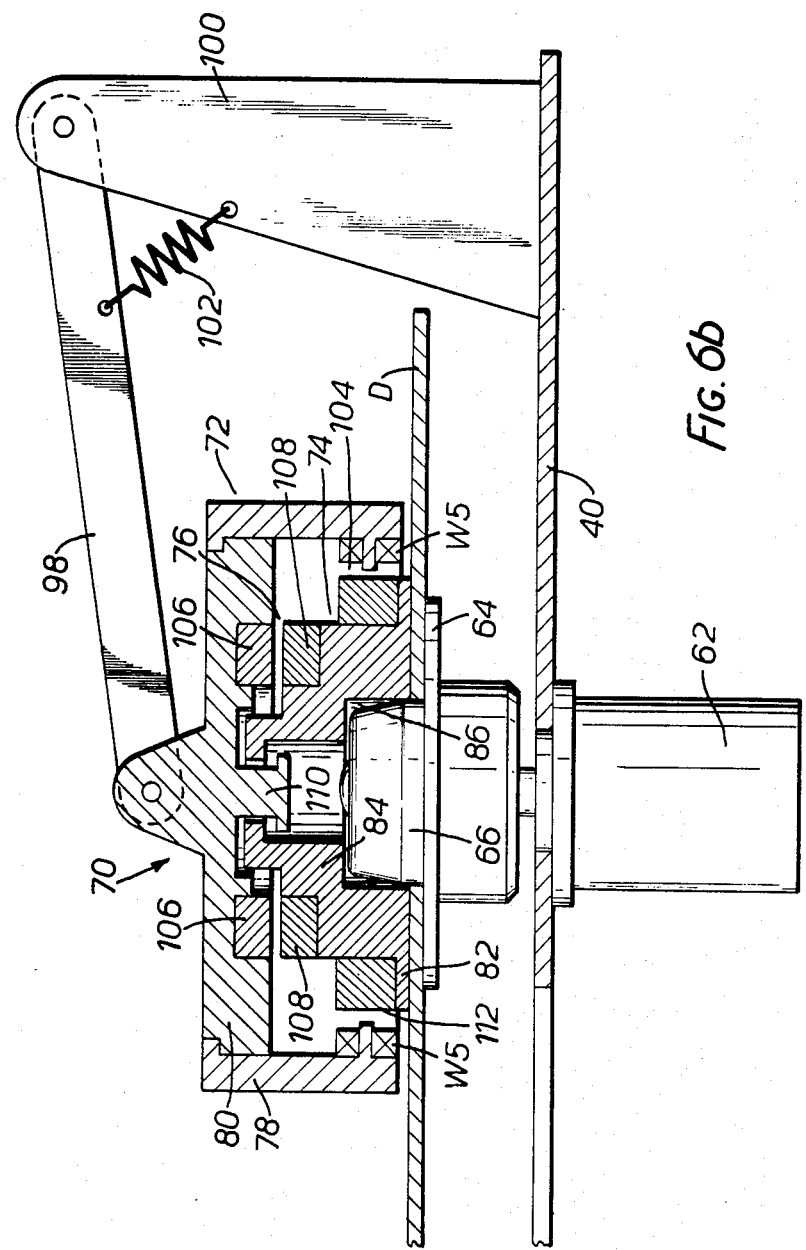

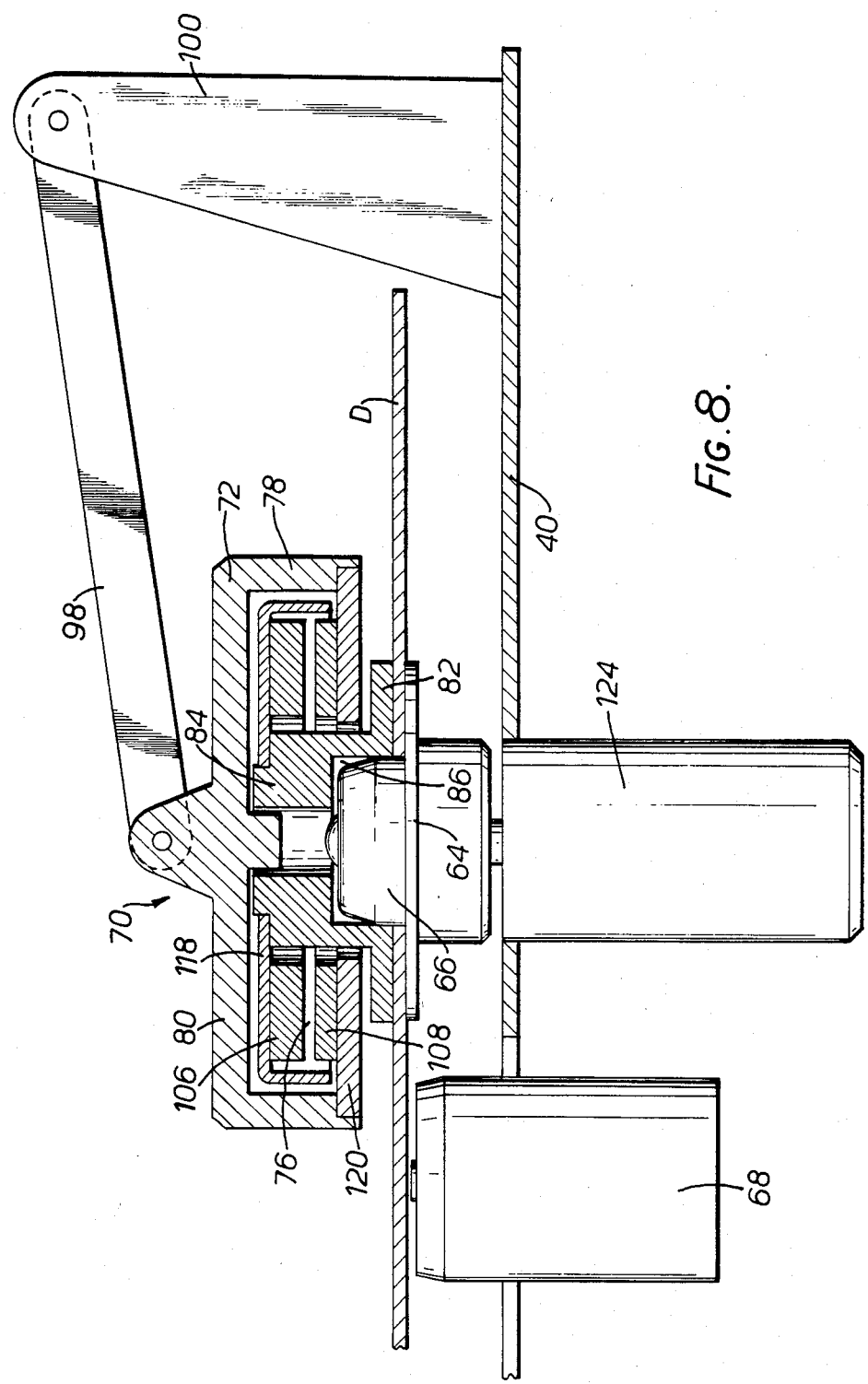

DISC ROTATING APPARATUS

FIELD OF THE INVENTION

This invention relates to a disc rotating apparatus, and more particularly to a mechanism, such as used for rotating a phonograph record disc, a video record disc, a digital audio record disc or a magnetic record disc which is received on a turntable by clamping the disc firmly in cooperation with the turntable.

BACKGROUND OF THE INVENTION

Recently, a PCM (pulse code modulation) technique has been developed and applied to a recording or reproducing system for both video discs and for audio discs. A recording of a PCM signal onto or off a disc is done optically or electrostatically.

In reproducing the PCM signal from a disc, optical pickups or electrostatic pickups are used to trace the recorded track of the disc while it is rotated at a very high speed.

The rotation of the disc must follow precisely the rotation of the turntable since the rotation speed of the turntable varies in accordance with a rotation speed control signal extracted from the reproduced PCM signal.

Therefore, it is desirable for the disc rotating apparatus not only to support the disc firmly on the turntable during the playing of a disc but also to allow the easy removal of the disc from the turntable after playing the disc.

Some conventional disc rotating apparatuses have been used. One of them has a clamp biased against the turntable by a spring. The clamp presses the disc against the turntable during playing. The spring, however, causes friction between the clamp and the spring so that a strong driving power for rotating the disc is needed. Wow and flutter characteristics caused by the rotation of the turntable can become worse due to the friction between the clamp and spring adversely effecting the rotation speed control.

Other devices use a permanent magnet as a clamp. The attractive force between the permanent magnet and the turntable made of a magnetic material holds the disc between them. However, it is difficult to remove the disc from the turntable because the permanent magnet is attracted to the turntable. Furthermore, the turntable must be fabricated of a magnetic material.

SUMMARY OF THE INVENTION

It is, therefore, an object of the present invention to provide an apparatus for rotating a disc, clamped to the turntable in a manner to achieve less friction.

Another object of the present invention is to allow easy removal of a disc from the turntable after playing the disc.

A further object of the present invention is to provide a disc rotating apparatus with means for clamping the disc which includes a motor for driving the apparatus.

According to the present invention, the disc rotating apparatus is provided with (a) a turntable adapted for receiving a disc and (b) means for clamping the disc received on the turntable in cooperation with the turntable, the clamping means including a plunger means slidable along one axis and rotatable about the same axis, means for holding the plunger means, and a magnetic propelling means provided between the plunger means and the holding means for urging the plunger means toward the disc located on the turntable.

Additional objects and advantages of the present invention will become apparent to persons skilled in the art from a study of the following description of the accompanying drawings.

BRIEF DESCRIPTION OF THE DRAWINGS

FIG. 4a is a perspective view of the magnetic propelling means of the disc rotating apparatus of FIGS. 3a and 3b;

FIG. 4b is illustrative of the operation of the motor system of the magnetic propelling means of FIG. 4a;

FIG. 5 is a circuit diagram of a conventional circuit for producing a revolving magnetic field;

FIGS. 6a and 6b are transverse sectional views of another embodiment of a disc rotating apparatus according to the present invention respectively in a non-operative and an operative condition;

FIG. 8 is a transverse sectional view of another embodiment of a disc rotating apparatus according to the present invention.

DESCRIPTION OF THE PREFERRED EMBODIMENT

Figure 1:
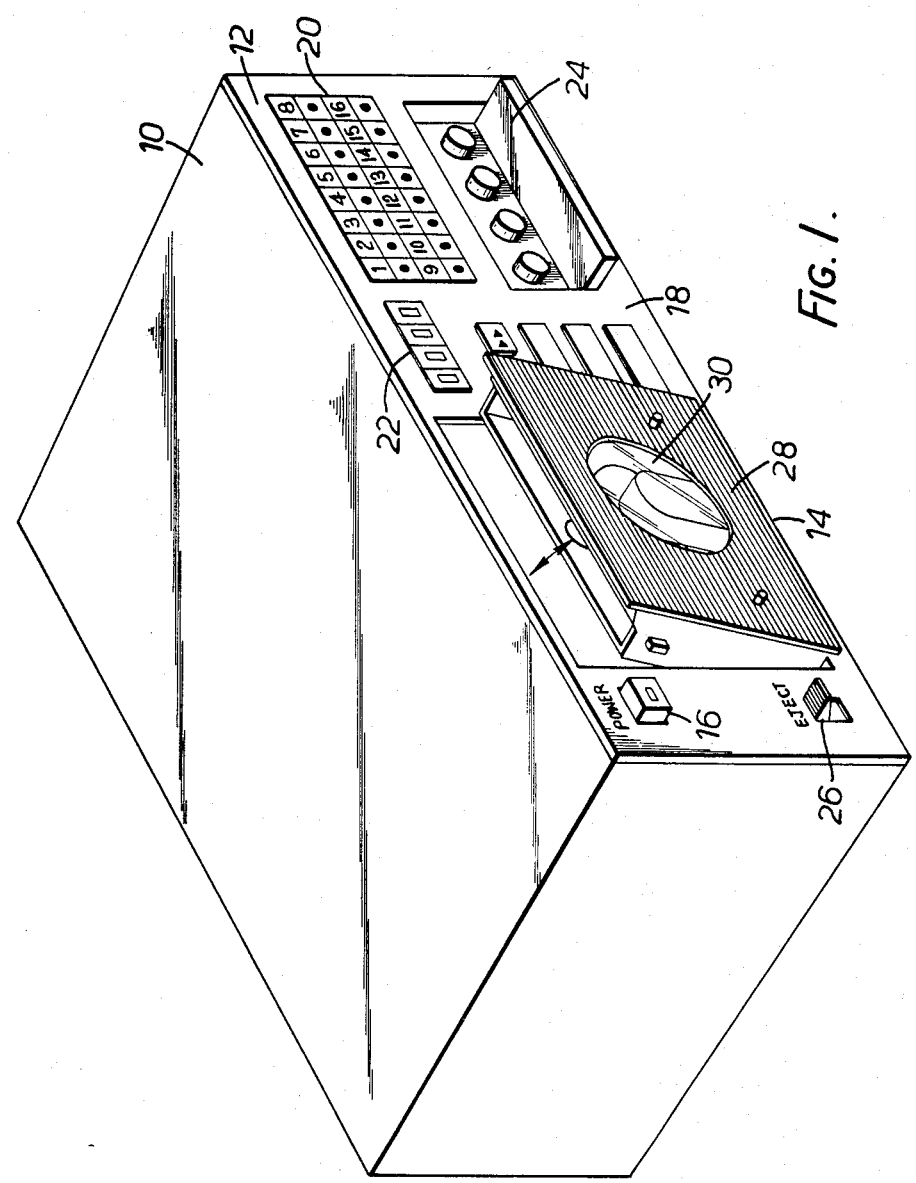
FIG. 1 is a perspective view of a digital audio disc player with a disc rotating apparatus according to the present invention.

The present invention will be described in detail with reference to the drawings FIG. 1 to FIG. 8. Throughout the drawings, like reference numerals will be used to designate like or equivalent portions, for the sake of simplicity of explanation.

FIG. 1 shows a perspective view of a digital audio disc player on which a disc rotating apparatus of the present invention is used. As shown in FIG. 1, casing 10 of the disc player has control panel 12 and carriage 14, a part of the disc rotating apparatus, on its front side. Control panel 12 is provided with power switch button 16, disc drive control section 18, program selector section 20 for selectively reproducing any program recorded on a disc, reproducing time display 22, reproduced signal adjusting section 24 and ejecting button 26 for carriage 14.

Figure 2:
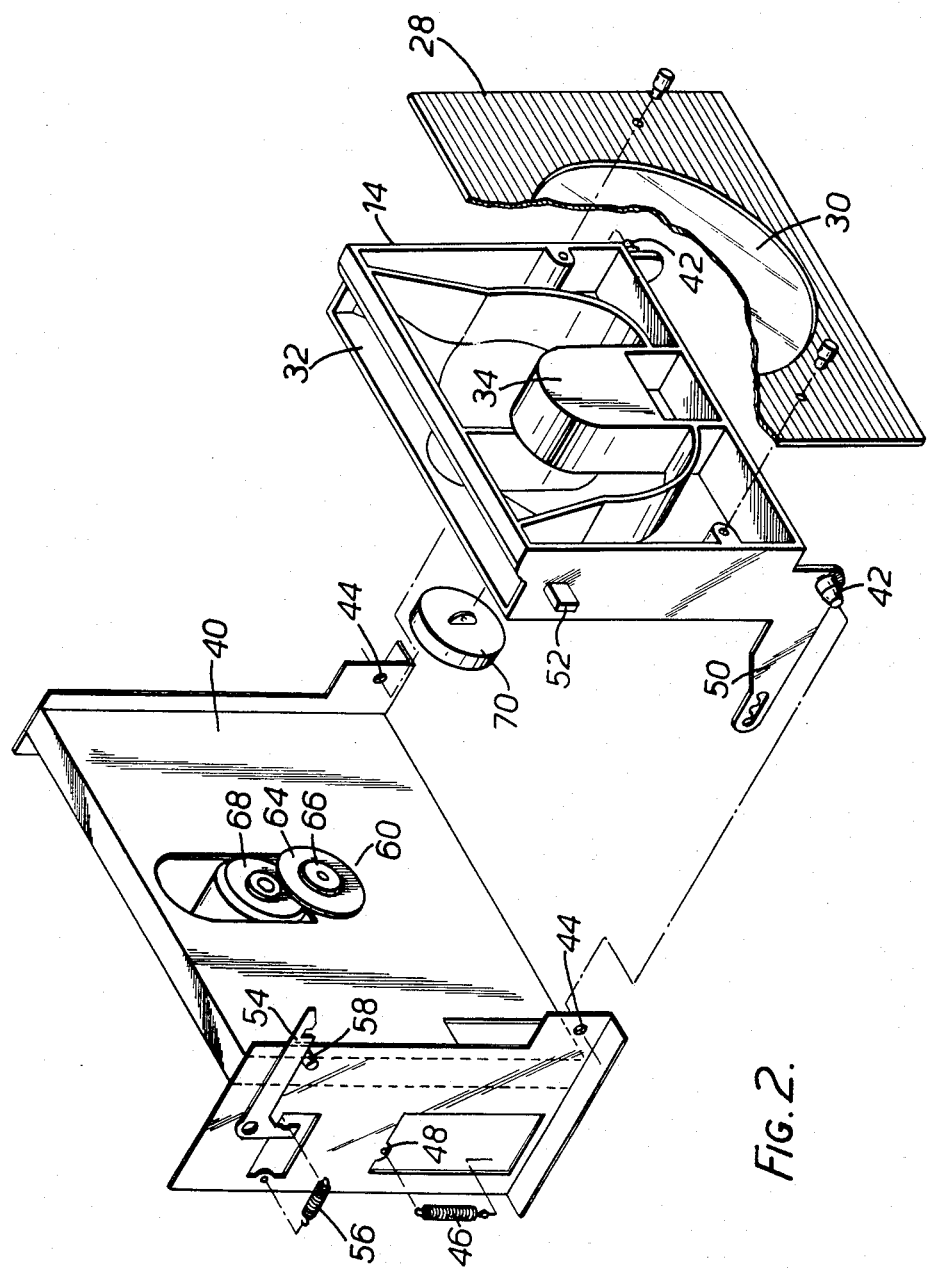
FIG. 2 is an exploded view of the disc rotating apparatus of the digital audio disc player of FIG. 1.

Carriage 14 is a thin wall, box-like section having cover 28 as shown in FIG. 2. Cover 28 has a transparent window 30 for showing the interior of carriage 14. Carriage 14 has disc carrying portion 32 with a slot-like opening at its upper end and clamper housing portion 34 adjacent to disc carrying portion 32 at the center of carriage 14.

Figure 3A:
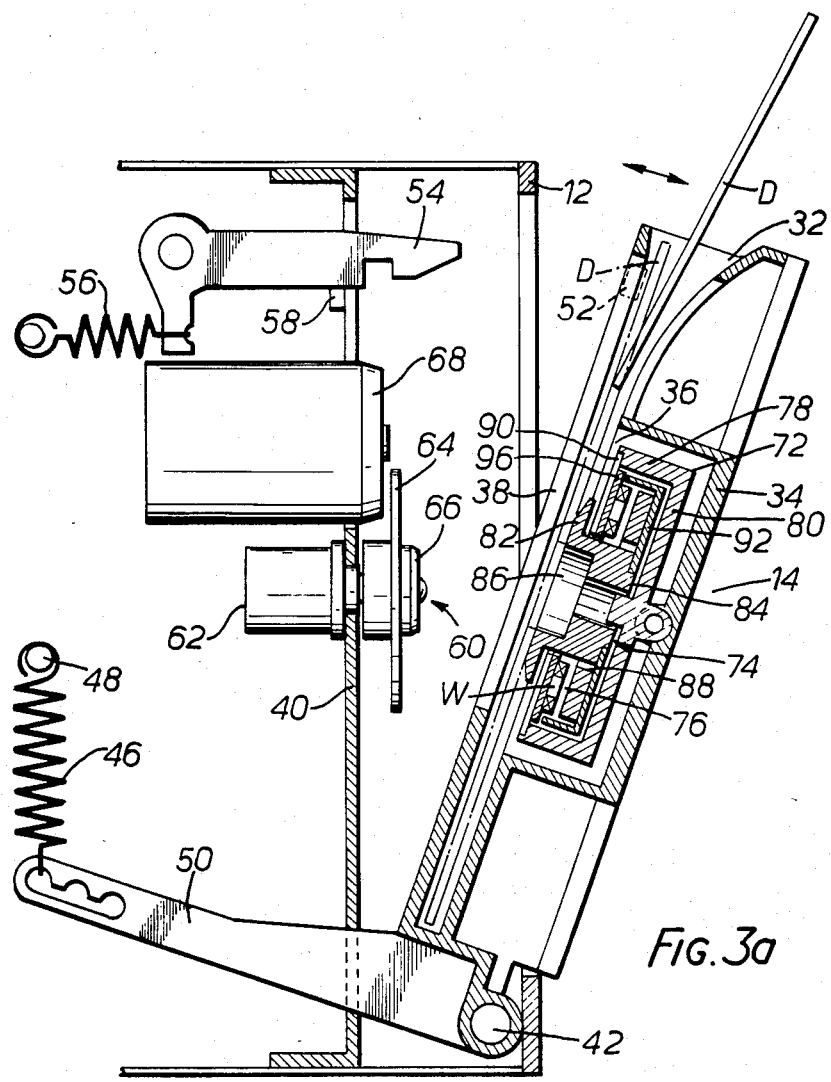
FIGS. 3a and 3b are longitudinal sectional views of the disc rotating apparatus according to the present invention with the carriage respectively in an ejected and a locked condition.

Disc carrying portion 32 includes two openings 36 and 38 (FIG. 3a). One opening 36 is formed on one side of disc carrying portion 32, adjacent to clamper housing portion 34 for connecting the disc carrying portion 32 with clamper housing portion 34. The other opening 38 is formed on the side of disc carrying portion 32 from opening 36.

Figure 3B:
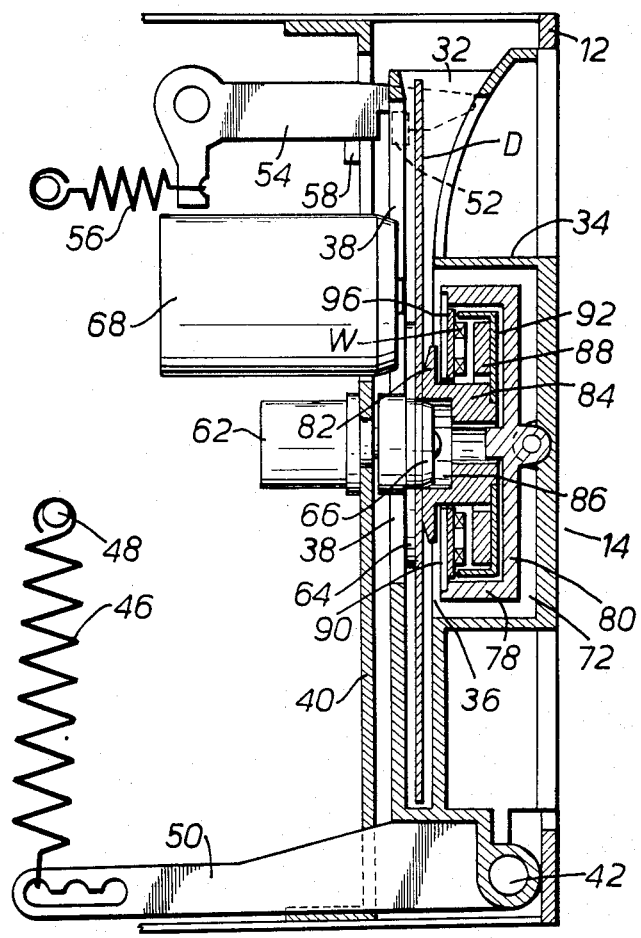

Carriage 14 is pivotably mounted on chassis 40 by means of pins 42 both protruding laterally from opposite sides of carriage 14 and mating with holes 44 of chassis 40. Carriage 14 is urged to an ejected or open position rotating about pins 42 by spring 46 suspended between pin 48 protruding from chassis 40 and lever portion 50 extending from carriage 14 as shown in FIGS. 3a and 3b. Pin 52 protruding from one side of carriage 14 engages latch 54 which is mounted on chassis 40. Latch 54 is biased by spring 56 in a clockwise direction. Latch 54 is also capable of being rocked in a counter-clockwise direction by ejecting member 58 associated with ejecting button 26 on control panel 12. FIGS. 3a and 3b show that carriage 14 is rotated into its ejected position by spring 46 and fastened in its playing or operating position by latch 54 respectively.

Turntable 60 opposes clamper housing portion of carriage 14 and is rotatably mounted on chassis 40 by means of bearing 62 secured on chassis 40 as shown in FIGS. 3a and 3b. Turntable 60 is comprised of disc table 64 and center spindle 66. Disc table 64 is adapted to support an inner non-recorded surface of a disc. Center spindle 66 is adapted to fit through a center hole of the disc. Optical pickup 68 is provided adjacent to turntable 60 for tracing a recorded track of the disc during rotation.

Carriage 14 is provided with clamper 70 mounted in clamper housing portion 34. Clamper 70 is comprised of holder 72, plunger 74 and magnetic propelling means 76. Holder 72 has tubular wall portion 78 and bottom wall portion 80 closing one end of tubular wall portion 78. Plunger 74 has head portion 82 and body portion 84. Body portion 84 of plunger 74 is slidable along an axis of plunger 74 and rotatable about the same axis. Head portion 82 of plunger 74 has a recess 86 adapted for receiving center spindle 66 of turntable 60. Magnetic propelling means 76 is comprised of annular permanent magnet 88 and annular plate made of a magnetic material, e.g., iron plate 90. Magnet 88 is supported on the inner end of body portion 84 of plunger 74 by means of yoke 92. Therefore, plunger 74 is always urged in the direction toward turntable 60 by the attraction between magnet 88 and iron plate 90.

Further, there is provided a revolving magnetic field producing circuit block 94 on iron plate 90 as shown in FIG. 4a. Circuit block 94 with magnet 88 forms a conventional permanent magnet motor system. Circuit block 94 has, for example, four coils $W_1$ to $W_4$, two Hall elements $H_1$, $H_2$ and printed circuit board 96. Printed circuit board 96 is mounted on iron plate 90, and supports coils $W_1$ to $W_4$ and Hall elements $H_1$, $H_2$ in their respective positions as shown in FIG. 4a. Printed circuit board 96 interconnects coils $W_1$ to $W_4$ and Hall elements $H_1$, $H_2$ to each other (FIG. 5). The four coils $W_1$ to $W_4$ and Hall elements $H_1$, $H_2$ face annular permanent magnet 88 which is circumferentially polarized in four north pole zones $N_1$ to $N_4$ and four south pole zones $S_1$ to $S_4$.

North and south pole zones $N_1$ to $N_4$ and $S_1$ to $S_4$ are associated with the four coils $W_1$ to $W_4$ and two Hall elements $H_1$, $H_2$ which are connected to each other through switching transistors $Q_1$ to $Q_4$ as shown in FIG. 5. When Hall element $H_1$ is facing north pole zone $N_1$ as shown in FIG. 4b-1, Hall element $H_1$ turns transistor $Q_1$ on. Then coil $W_2$ facing the demarcation between south pole zone $S_2$ and north pole zone $N_3$ is excited such that its upper end adjacent to magnet 88 represents a north pole. Coil $W_2$, therefore, attracts south pole zones $S_2$ and repels north pole zone $N_3$ so that magnet 88 is driven in the direction of arrow A. When south pole zone $S_2$ has moved to a position facing coil $W_2$ as shown in FIG. 4b-2, Hall element $H_2$ faces north pole zone $N_1$ and turns transistor $Q_3$ on, but transistor $Q_2$ is not on. Then coil $W_3$ facing the demarcation between north pole zone $N_3$ and south pole zone $S_3$ is excited such that its upper end represents a south pole. Coil $W_3$, therefore, attracts north pole zone $N_3$ and repels south pole zone $S_3$ so that magnet 88 is successively driven in the direction of arrow A. In the same manner, coils $W_4$, $W_1$ are excited in turn and drive magnet 88 in the direction A as shown in FIGS. 4b-3 and 4b-4.

Prior to reproduction of disc D, disc D is loaded in disc carrying portion 32 of carriage 14 through an upper opening of disc carrying portion 32 as shown in FIG. 3a. Then carriage 14 is manually pivoted around pins 42 against the force of spring 46 and locked in its operative position by latch 54 as shown in FIG. 3b. Disc D is clamped in place by plunger 74 and turntable 60. In this operating mode, center spindle 66 of turntable 60 is inserted through the center hole of disc D entering into recess 86 of head portion 82 of plunger 74. Disc table 64 is adjacent to and suppporting the inner non-recorded portion of disc D. Head portion 82 of plunger 74 is adjacent to and supporting the other side of disc D in opposition to disc table 64.

Plunger 74 clamps disc D firmly in cooperation with turntable 60 due to the magnetic attraction between annular permanent magnet 88 and iron plate 90. In this clamping state (FIG. 3a), body portion 84 of plunger 74 is held away from holder 72. Thus plunger 74 does not touch any portion of holder 72. Plunger 74, therefore, is able to rotate disc D free from mechanical friction between holder 72 and plunger 74.

In the locked condition of carriage 14, holder 72 is always urged in a direction away from turntable 60 by the attraction between magnet 88 and iron plate 90. Carriage 14 is, therefore, easily moved to its open position (FIG. 3a) when latch 54 is released by ejecting member 58 as shown in FIG. 3a.

While carriage 14 is released to the position shown in FIG. 3a, annular permanent magnet 88 on plunger 74 is drawn to iron plate 90 on holder 72 by the magnetic attraction thereof. However, annular permanent magnet 88 does not come in contact with coils $W_1$ to $W_4$ or Hall elements $H_1$, $H_2$ since yoke 92, extending along tubular wall portion 78 of holder 72 to printed circuit board 96, leaves a magnetic gap the thickness of printed circuit board 96 between the end of yoke 92 and iron plate 90. Due to the magnetic gap between yoke 92 and iron plate 90, plunger 74 is easily pushed back into holder 72 by turntable 60 when carriage 14 is pivoted to the operative condition. On the other hand, the magnetic attraction maintains plunger 74 pressed to disc D during the operative condition which is maintained at a proper magnitude due to the magnetic gap between the end of yoke 92 and iron plate 90 being made narrow.

Figure 6A:
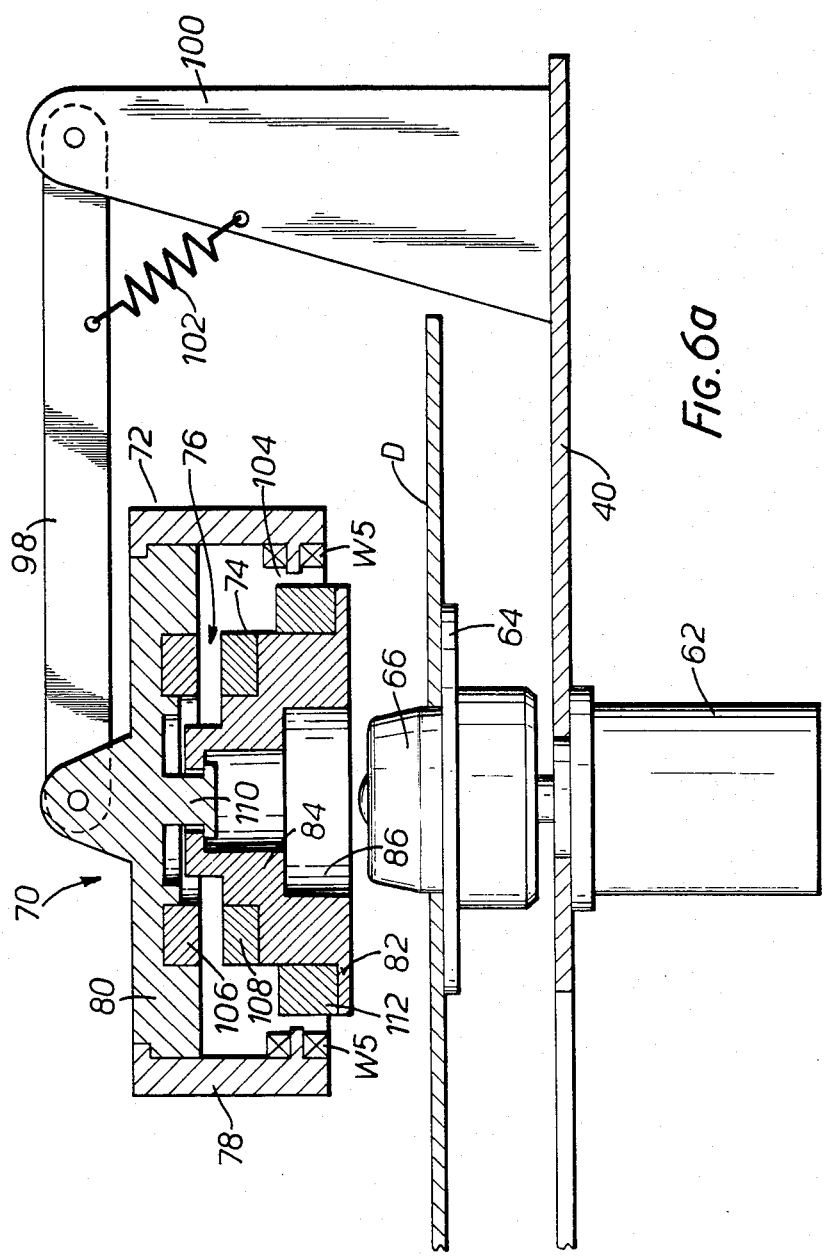

FIGS. 6a and 6b illustrate another embodiment of the present invention. Turntable 60 is horizontally oriented receiving disc D on its upper surface. In a position above turntable 60, clamper 70 is suspended from one end of lever 98 whose other end is pivoted on post 100 mounted on chassis 40. Clamper 70 is normally pressed against turntable 60 by means of its weight and spring 102 suspended between lever 98 and post 100 as shown in FIG. 6a. Clamper 70 is comprised of holder 72, magnetic propelling means 76 and motor system 104.

Plunger 74 is loosely held in holder 72. Magnetic propelling means 76 is comprised of two annular permanent magnets 106, 108, respectively fixed on holder 72 and plunger 74. The two permanent magnets 106, 108 face each other oriented with their respective same magnetic poles opposite one another. Plunger 74 is, therefore, urged in a direction toward turntable 60 by repulsion between the two permanent magnets 106, 108. When plunger 74 is being pulled away from turntable 60, plunger 74 hangs from support pin 110 downwardly from the center of holder 72 along an axis of holder 72 as shown in FIG. 6a. But plunger 74 does not touch any portion of holder 72 while clamper 70 clamps disc D in cooperation with turntable 60 as shown in FIG. 6b, similarly to the first embodiment shown in FIG. 3b.

Further, motor system 104 is a conventional permanent magnet motor constructed between holder 72 and plunger 74. Stator coils $W_5$ of motor system 104 are mounted on an inner surface of tubular wall portion 78 of holder 72. Annular rotor magnet 112 of motor system 104 is mounted on plunger 74 in opposition to stator coils $W_5$, and polarized in a manner similar to the annular permanent magnet 88 of the first embodiment. Accordingly plunger 74 rotates in accordance with the revolving magnetic field produced by stator coils $W_5$ operating on rotor magnet 112 like the motor system shown in FIG. 4b.

Rotor magnet 112 is shifted slightly downward from a position directly opposite stator coils $W_5$ by the repulsion between the two magnets 106 and 108 when clamper 70 is pulled away from turntable 60 as shown in FIG. 6a. But rotor magnet 112 is held in position facing the center of coils $W_5$ while clamper 70 clamps disc D in cooperation with turntable 60 as shown in FIG. 6b.

Figure 7:
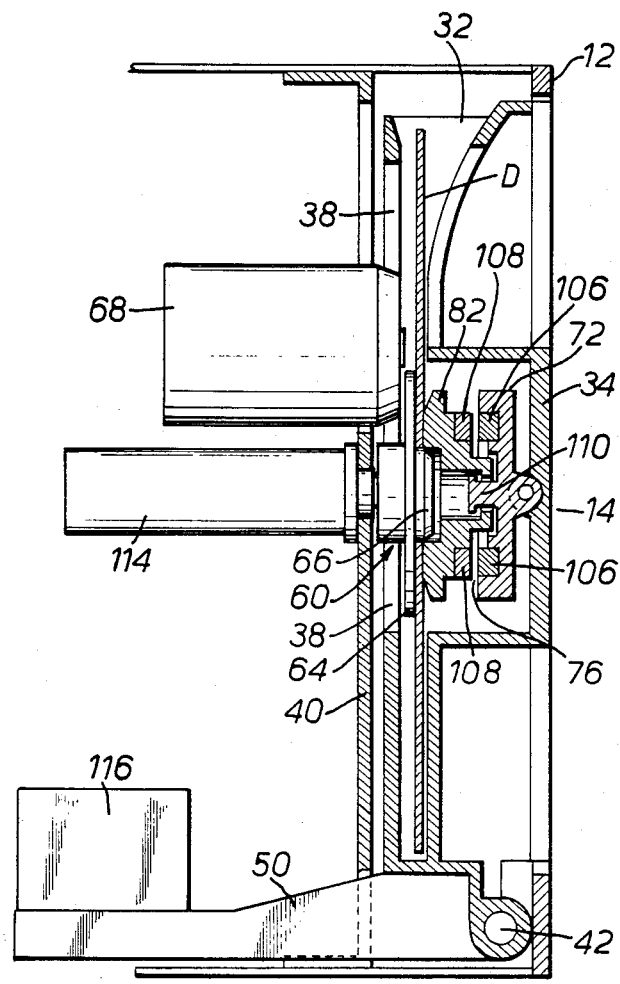
FIG. 7 is a longitudinal sectional view of a further embodiment of a disc rotating apparatus according to the present invention.

FIG. 7 illustrates another embodiment of the present invention. Carriage 14 and turntable 60 are similarly constructed to the first embodiment shown in FIGS. 3a and 3b. Turntable 60 is driven by conventional motor 114 being coupled to a shaft of turntable 60. On the other hand, clamper 70 has magnetic propelling means 76 comprised of two permanent magnets 106 and 108 with respective same poles facing one another similar to the second embodiment shown in FIGS. 6a and 6b. But it does not have any magnetic motor driving means. Carriage 14, in a disc operative condition, is urged in a direction toward turntable 60 by means of weight 116 attached to carriage 14 through lever portion 50. In order to load disc D in disc carrying portion 32 of carriage 14, carriage 14 is rotated away from turntable 60 about pin 42 of carriage 14 and against weight 116.

FIG. 8 illustrates a further embodiment of the present invention. Turntable 60 and clamper 70 are mounted on chassis 40 in a manner similar to that of the second embodiment shown in FIGS. 6a and 6b. Turntable 60 is, however, driven by conventional motor 124 being coupled to a shaft of turntable 60. Clamper 70 is urged downwardly toward horizontally located turntable 60 by means of the weight of the clamper 70 itself. Clamper 70 has magnetic propelling means 76 comprised of two permanent magnets 106 and 108 respectively mounted on holder 72 and plunger 74 through respective supporting members 118 and 120. Magnet 108 mounted on holder 72 is placed between magnet 106 on plunger 74 and turntable 60. The two magnets 106 and 108 are oriented with opposite poles facing each other so that plunger 74 is biased in a direction toward turntable 60. Magnet 106 on plunger 74 is drawn much closer to magnet 108 on holder 72 when clamper 70 is lifted away from turntable 60. The two magnets 106 and 108 however, do not contact each other because the repulsive force leaves a predetermined space between them. This causes plunger 74 to be easily free from contact with holder 72 when clamper 70 is moved to clamp disc D in cooperation with turntable 60.

What is claimed is:

1. An apparatus for rotating a disc comprising:
 a turntable adapted for receiving the disc;
 clamping means, including a holder and a plunger, for engaging and clamping the disc firmly into cooperation with said turntable when the plunger is in a first position and for permitting the removal of the disc from the turntable when the plunger is in a second position; said holder being positioned opposite to the turntable;
 said plunger being adapted to engage the side of the disc opposite to the turntable, being slideable relative to said holder, and being rotatable about its own axis;
 a first permanent magnet fixed to a portion of the plunger and magnetic material fixed to the holder and positioned between the turntable and the portion of the plunger to which the permanent magnet is fixed, said first permanent magnet and magnetic material cooperating to create a magnetic clamping force for urging the plunger to slide relative to the holder toward the turntable; and
 means for creating a revolving magnetic field for rotationally driving said permanent magnet together with said plunger about the plunger's axis, said magnetic field creating means and the permanent magnet cooperating to provide a magnetic motor system serving as a means for rotating the turntable, the disc and the plunger when the plunger is in the first position and the disc is clamped between the turntable and the plunger.

2. Apparatus for rotating a disc according to claim 1 further comprising:
 means for placing said clamping means in said first position for clamping said disc received on said turntable.

3. Apparatus for rotating a disc according to claim 2 wherein said placing means is a fastener means fastening said clamping means in said first position.

4. Apparatus for rotating a disc according to claim 3 further comprising:
 means for displacing said clamping means from said first position to said second position when said clamping means is detached from said disc received on said turntable.

5. Apparatus for rotating a disc according to claim 4 wherein said displacing means is a spring for urging said clamping means toward said second position.

6. Apparatus for rotating a disc according to claim 1 further comprising:
 carriage means movable between a first position when said clamping means clamps said disc received on said turntable in cooporation with said turntable and a second position when said clamping means is detached from said disc, said carriage means carrying said clamping means.

7. Apparatus for rotating a disc according to claim 6 wherein said carriage means includes a portion for carrying said disc in a position, with a first surface facing said clamping means.

8. Apparatus for rotating a disc according to claim 7 wherein said disc carrying portion is defined by a slot for receiving said disc.

9. Apparatus for rotating a disc according to claim 8 wherein said disc carrying portion further defines openings for insertion of said turntable and said plunger means into said disc carrying portion.

10. The apparatus of claim 1 further comprising a yoke attached to the plunger for engaging the holder and spacing the permanent magnet from the holder when the plunger is in the second position.

11. The apparatus of claim 1 wherein the means for creating a revolving magnetic field includes a circuit block fixed to said holder.

12. The apparatus of claim 11 wherein a portion of said plunger is in contact with the holder when the plunger is in the second position and wherein the plunger does not touch any portion of the holder when the plunger is in the first position and further comprising a yoke attached to the plunger for engaging the holder and spacing the permanent magnet from the holder when the plunger is in the second position.

13. The apparatus of claim 1 wherein a portion of said plunger is in contact with the holder when the plunger is in the second position and wherein the plunger does not touch any portion of the holder when the plunger is in the first position.

14. An apparatus for rotating a disc comprising:
a turntable adapted for receiving the disc;
clamping means, including a holder and a plunger, for engaging and clamping the disc firmly into cooperation with said turntable when the plunger is in a first position and for permitting the removal of the disc from the turntable when the plunger is in a second position;
said holder being positioned opposite to the turntable;
said plunger being adapted to engage the side of the disc opposite to the turntable, being slideable relative to said holder, and being rotatable about its own axis;
an annular permanent magnet fixed to a portion of the plunger with its center aligned with the axis of the plunger;
magnetic material affixed to the holder and positioned between the turntable and the portion of the plunger to which the permanent magnet is fixed, said permanet magnet and magnetic material cooperating to create a magnetic clamping force for urging the plunger to slide relative to the holder toward the turntable; and
means for creating a revolving magnetic field for rotationally driving said permanent annular magnet together with said plunger about the plunger's axis, the magnetic field creating means and the annular permanent magnet cooperating to provide a magnetic motor system for rotating the turntable, the disc, and the plunger when the plunger is in the first position and the disc is clamped between the turntable and the plunger.

* * * * *